Oct. 31, 1939.  A. S. T. LAGAARD  2,178,261
DOUGH CUTTER
Filed June 27, 1938  4 Sheets-Sheet 3

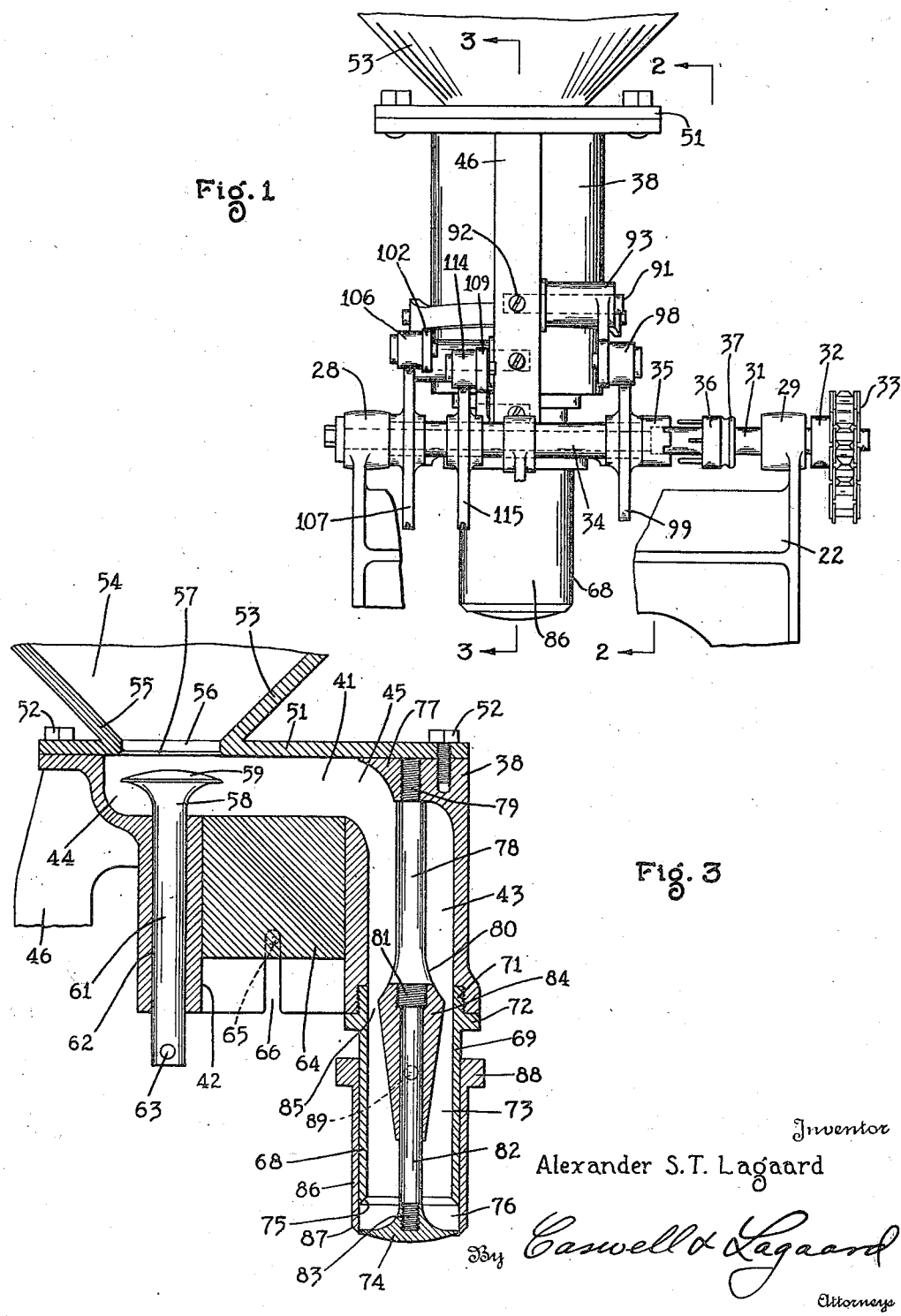

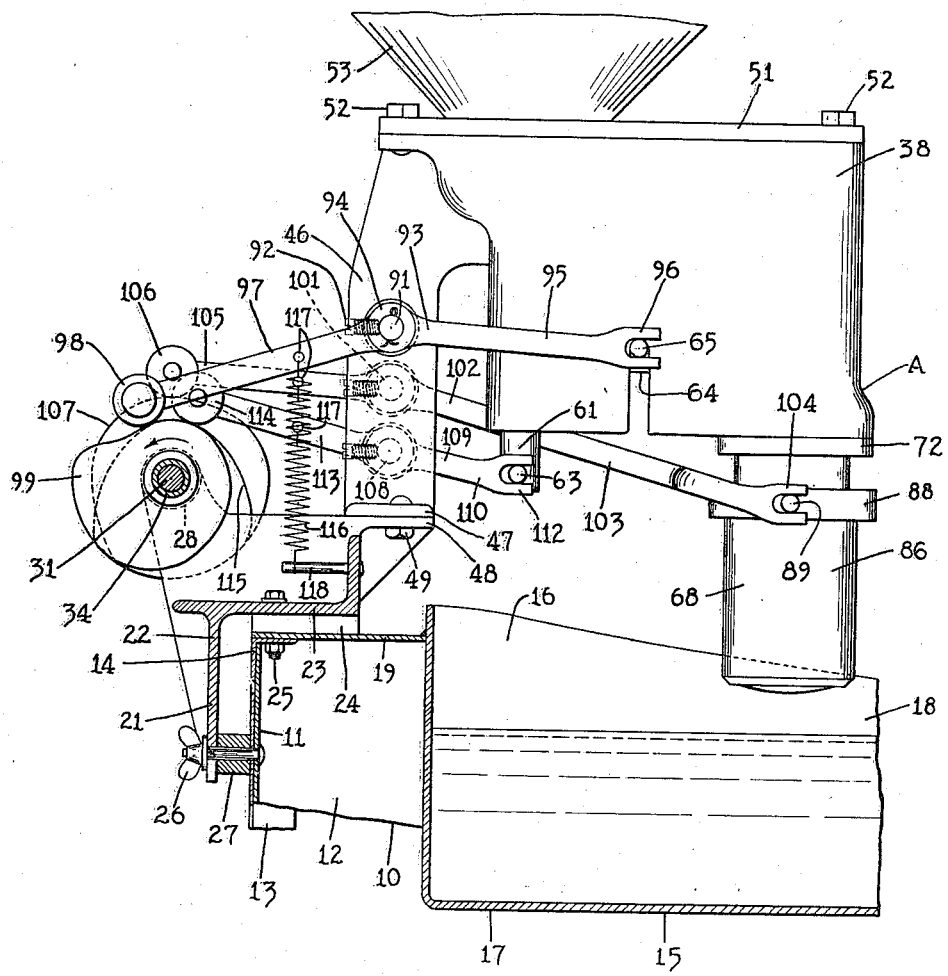

Inventor
Alexander S. T. Lagaard
By Caswell & Lagaard
Attorneys

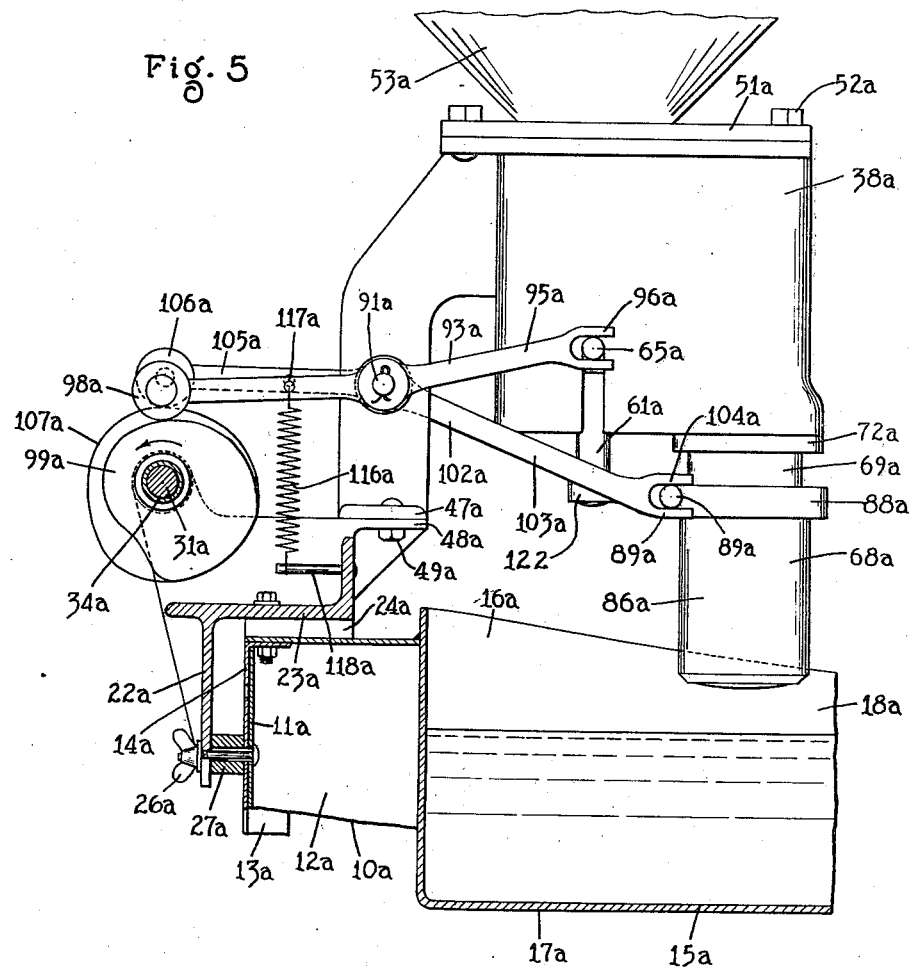

Patented Oct. 31, 1939

2,178,261

UNITED STATES PATENT OFFICE 2,178,261

DOUGH CUTTER

Alexander S. T. Lagaard, Minneapolis, Minn., assignor to Dough-King, Inc., Minneapolis, Minn., a corporation of Minnesota Application June 27, 1938, Serial No. 216,024

9 Claims. (Cl. 107—14)

My invention relates to dough cutters and particularly to cutters used for cutting annular formations of dough such as doughnuts and the like.

An object of my invention resides in providing a dough cutter which will be simple in construction and positive in operation.

Another object of my invention resides in providing a dough cutter in which accurately measured quantities of dough can be repeatedly severed from the mass of dough.

Another object of my invention resides in providing a dough cutter in which all of the operating parts travel in the same general direction.

A still further object of my invention resides in providing a dough cutter in which the various operating parts may be independently operated to prevent unintentional operation of certain of the parts during operation of other of the parts.

An object of the invention resides in providing a dough cutter in which the extrusions are of uniform dimensions throughout their circumferential extent.

An object of the invention resides in providing a dough cutter having a discharge passageway terminating in a die for forming annular extrusions and in providing means within said passageway for procuring uniform pressure of the dough circumferentially at the die.

Another object of the invention resides in constructing the die with a sleeve and a circular head associated therewith and carried by a stem concentric with the sleeve and forming an annular passageway for conducting the dough to the die.

An object of the invention resides in providing a constriction in said passageway.

A feature of the invention resides in forming an enlargement on said stem extending circumferentially about the same and forming said constriction.

Another object of the invention resides in constructing a dough cutter so that the stem is supported in a manner to eliminate the use of bridges or other similar supporting devices.

A still further object of the invention resides in providing a dough cutter in which the dough enters the receiving chamber through the shortest possible path.

Another object of the invention resides in utilizing a piston and cylinder for drawing dough into the receiving chamber and in further providing a valve for controlling the entry of the dough into said chamber and in positioning said valve in close proximity to said cylinder so as to reduce the length of travel of the dough in entering said chamber.

Other objects of the invention reside in the novel combination and arrangement of parts and in the details of construction hereinafter illustrated and/or described.

In the drawings:

Fig. 1 is an elevational view of a portion of a doughnut machine illustrating an embodiment of my invention applied thereto.

Fig. 2 is an elevational sectional view taken on line 2—2 of Fig. 1.

Fig. 3 is a fragmentary elevational sectional view taken on line 3—3 of Fig. 1.

Fig. 5 is a sectional view similar to Fig. 2 taken on line 5—5 of Fig. 4.

Figure 4:
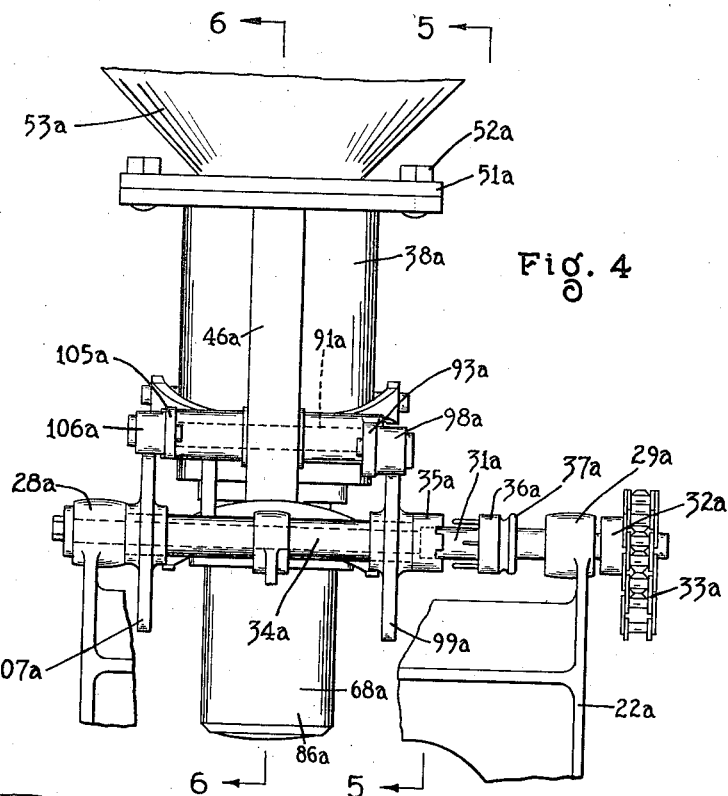
Fig. 4 is a view similar to Fig. 1 of a modification of the invention.

My invention resides in a dough cutter which may be applied to any type of doughnut machine. Since this invention is associated with a portion only of the structure shown in said application, so much thereof as will be needed to describe the present invention will be shown, reference being had to the said application for patent for further details of the remainder of the doughnut machine.

The doughnut machine with which the invention is illustrated comprises a case 10, which is constructed with a rear wall 11, side walls 12, and a front wall not shown. These walls are attached to angle iron legs 13, one of which is shown in Fig. 2. The upper ends of these walls have secured to them angle iron frame members, the member attached to wall 11 being indicated by the reference numeral 14.

Supported in the case 10 is a pan 15 which is constructed with vertical walls 16 and a bottom 17 which forms a way 18 along which the cooking liquid travels. The way 18 is provided with a number of reaches, which have not been shown in this application, and the doughnut cutter forming a feature of the invention is attached to the machine in such a manner as to discharge the cut dough in one of the reaches of the way 18.

The upper portion of the pan 15 has attached to it a table 19, which is supported on the frame members 14 and secured thereto. Cooking liquid is progressed through the way 18 of the pan 15 by means of an impeller, not shown, which causes circulation of the cooking liquid through the machine and which causes the doughnuts deposited by the cutter to be progressed through the machine. At a suitable position in the way 15 the doughnuts are turned over and at the end of the way the finished doughnuts are removed from the machine, all as disclosed in said application for patent of Peter J. Toews.

The case 10 has attached to it a bracket 21 which is constructed with a flange 22 extending along the rear wall 11 of said case and with a base 23 overlying the table 19 and frame member 14. The base 23 of bracket 21 rests upon a bar 24 overlying table 19 and is secured to the said bar and frame member by means of bolts 25. The flange 22 of bracket 21 is secured to the leg 13 of the case 10 by means of a bolt 26 and a spacer 27. This bracket supports the cutter proper which is indicated in its entirety by the reference numeral A, and the operating mechanism B, by means of which said cutter is operated. These parts will now be described in detail.

The operating mechanism B is shown in Figs. 1 and 2. Formed on the base 23 are two bearings 28 and 29, in which is journaled a shaft 31. This shaft is driven in any suitable manner from the transmission of the machine which is situated below the pan 15 and which has not been illustrated in the drawings. A sprocket wheel 32 and a chain 33 have been shown for the purpose. Rotatably mounted on the shaft 31 is a sleeve 34 which carries all of the operating parts of the operating mechanism B, and which affect movement of the parts of the cutter, and which will be presently more fully described. Sleeve 34 is constructed with a jaw clutch 35 which is adapted to be engaged with another jaw clutch 36, splined to the shaft 31. Any desired construction may be used for operating the jaw clutch member 34, a nob 37 having been shown in the drawings.

The cutter A, best shown in Fig. 3, comprises a body 38, which is constructed to provide a receiving chamber 41 at the upper end of the same, open at the top and communicating with a cylinder 42, and a tubular passageway 43. The chamber 41 is constructed with an inlet end 44, into which the dough is drawn and with an outlet end 45, delivering the dough to the passageway 43. The body 38 is provided with a leg 46 projecting downwardly from the upper portion of the same and which is constructed with a foot 47, adapted to rest upon a flange 48, formed on the bracket 22. A number of bolts 49 are used for the purpose.

The upper surface of the body 38 is flat and is closed by means of a plate 51, which is secured thereto through cap screws 52 threaded into the said body. This plate has secured to the upper portion of the same a hopper 53 provided with a chamber 54 in which the dough is placed. The lowermost portion of the hopper 53, which is indicated by the reference numeral 55, is constructed to form a throat having a passageway 56 through which the dough travels from the chamber 54 into the inlet end 44 of the receiving chamber 41.

The throat 55 of the hopper 53 is constructed on the underside thereof with an annular valve seat 57. A poppet valve 58 has a valve head 59, which is adapted to seat against seat 57 and to control the entry of dough into the receiving chamber 41. This valve includes a valve stem 61, to which the head is attached, which valve stem is guided for reciprocating movement in a guideway 62, formed in the portion of the body 38 immediately below the hopper 53. The lower end of the valve stem 61 projects below the said body and has attached to it a transversely extending pin 63 by means of which the valve 58 is operated.

Disposed in the cylinder 42 is a piston 64. This piston is adapted to be reciprocated in a vertical direction and when moved downwardly draws dough from the hopper 54, through the passageway 56 and into the receiving chamber 41 and cylinder 42. Upon closure of the valve 58 and movement of the piston 64 upwardly, the dough is discharged from the chamber 41 through the outlet 45 thereof and into the passageway 43. The piston 64 has attached to the lower portion thereof two diametrally aligning pins 65 which operate in slots 66 in the walls of the body 38, forming the cylinder 42 and which project outwardly beyond the same.

Disposed beneath the lowermost portion of the body 38, and immediately below the passageway 43, is a die 68, by means of which annular extrusions are formed as the dough is extruded from the cutter. This die consists of a tube 69, formed with a threaded end 71, adapted to be screwed into the body 38 of the cutter. A collar 72 formed on said tube facilitates the application of the tube to said body and assists in providing a tight joint between the tube and body.

Tube 69 is constructed with a bore 73, which is in axial alignment with the passageway 43, previously referred to. The die 68 further includes a die head 74 of a diameter equal to the external diameter of the tube 69. This die head is spaced from the lower end 75 of tube 69 to provide a passageway 76 through which the dough may be extruded. This die head is supported in the following manner: At the uppermost part of the body 38 the same is constructed with an overhanging portion 77. A stem 78 is centrally located within the passageway 43 and the bore 73, and is constructed at its upper end with a reduced threaded portion 79, which is screwed into suitable threads formed in the overhanging portion 77, of the body 38. The stem 78 flares outwardly, as indicated at 80, intermediate the ends thereof and following said flare is constructed with a threaded portion 81 and a shank 82 of lesser diameter than said threaded portion. This shank has a reduced portion 83 at its lower end which is threaded to receive the die head 74. Mounted upon the shank 82 is a conical sleeve 84 which screws upon the threaded portion 81 and which forms a constriction at the locality indicated by the reference numeral 85 in the bore 73 forming a continuance of passageway 43. The sleeve 84 and the flare 81 are so formed that a continuous smooth surface is provided, along which the dough travels and by means of which the pressure of the dough is gradually increased or decreased.

Operating in conjunction with the die head 74 is a sleeve 86, which is mounted upon the exterior of the tube 69. This sleeve is constructed with a beveled edge 87, which is adapted to engage the die head 74 to cut off the extrusions of dough ejected from passageway 76. The sleeve 86 is formed at its upper end with a collar 88, to which are attached two diametrally extending aligning pins 89, by means of which the said sleeve may be reciprocated.

The piston 64 is reciprocated by construction disclosed in Figs. 1 and 2. The leg 46 of body 38 has attached to it a stud shaft 91, which projects outwardly therefrom and which is held in position by means of a set screw 92. A lever 93 is formed with a boss 94, which is mounted for oscillation on stud 91. Lever 93 includes a forked arm 95, which is formed with bifurcated ends 96, adapted to receive the pins 65, attached to the piston 64. This arm embraces a portion of the body 38, forming the cylinder 42, and the guideway 62, and is situated somewhat above the lowermost portion of said body. The lever 93 is also constructed with another arm 97, which has pivoted to the end thereof a roller 98. Roller 98 engages a cam 99 fast on the sleeve 34 previously referred to. This cam is so designed that as the sleeve 34 rotates, piston 64 is alternately raised and lowered in timed relation with the operation of the other parts of the invention.

The sleeve 86 of the die 68 is operated in a manner similar to the piston 64. Attached to the leg 46 and on the opposite side from which the stub shaft 91 issues, is a second stub shaft 101. This stub shaft has mounted on it, for oscillation, a lever 102. This lever 102 has a forked arm 103 which also straddles the body 38 and which is constructed with bifurcated ends 104, adapted to receive the pins 89 formed on sleeve 86.

The lever 102 also includes an arm 105, which has rotatably mounted upon the end of it, a cam roller 106. This cam roller rides upon a cam 107, which is also secured to sleeve 34. Cam 107 is so designed as to cause the sleeve 86 to raise and lower at the proper times in conjunction with the piston 64. The valve 58 is reciprocated in a similar manner to the piston 64 and the sleeve 86. For this purpose another stub shaft 108 is secured to the leg 46, immediately below the stub shaft 101. This stub shaft has mounted upon it a lever 109. Lever 109 is constructed with a bifurcated arm 111, which straddles the valve stem 61. The arm 110 is constructed with bifurcated ends 112, which receive the pin 63, secured to the end of the stem 61. The lever 109 further includes an arm 113, which has rotatably mounted upon the end of the same a roller 114. Roller 114 engages a cam 115 mounted on shaft 34, which is suitably designed to procure the desired movement of the valve.

All of the rollers of the levers 93, 102 and 109 are held in contact with the respective cams, with which they cooperate through a number of tension coil springs 116. These tension springs are hooked on pins 117, secured to said levers and on other pins 118 secured to the bracket 22.

The operation of the invention is as follows: When the hopper 53 is filled with dough, and the machine set into operation by operating the clutch member 36, valve 58 is lowered to the position shown in Fig. 3 and the piston 64 then is caused to travel downwardly. This draws dough from the hopper 54 through the passageway 56, and into the inlet end 44 of the receiving chamber 41. The dough also is drawn into the cylinder 42 as the piston 64 lowers. Upon the piston reaching its lowermost position, valve 58 is raised and the head 59 thereof engages the valve seat 57 and closes communication between the chamber 54 and chamber 41. After the valve 58 is closed, sleeve 86 is raised by means of the lever 102 and cam 107. Thereafter the piston 64 commences its upward travel. This creates a pressure in the chamber 41 which forces the dough into the passageway 43, through constriction 85 therein, and into the bore 73 of tube 69, from which the dough passes through the passageway 65 and is extruded from the die 68. Due to the constriction 85, considerably more pressure is created within the chamber 41 than exists in the bore 73. This causes uniform pressure of the dough circumferentially throughout the constriction 85 so that the dough, on expanding in the bore 73, travels uniformly throughout the remainder of the passageway of die 68, whereby uniform extrusions result. In this manner doughnuts of uniform lateral dimensions throughout the entire circumferences thereof are procured.

Figure 6:
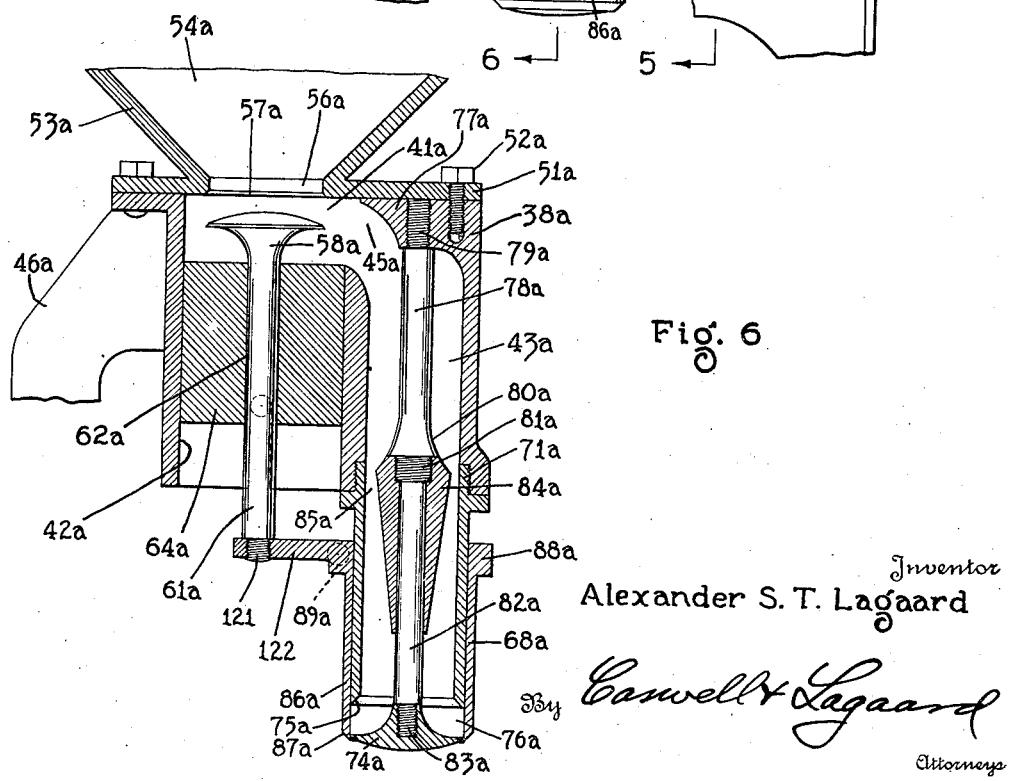
Fig. 6 is a view similar to Fig. 3 of the form of the invention shown in Fig. 4 and taken on line 6—6 of Fig. 4.

In Figs. 4, 5 and 6 I have shown a modification of the invention in which the valve mechanism for controlling the flow of dough into the receiving chamber is concentrically arranged with reference to the piston and cylinder. Inasmuch as certain of the parts are identical in construction with the parts of the invention previously described, the description thereof will not be repeated and the same reference numerals having the suffix "a" attached thereto will be used to designate corresponding parts.

In the dough cutter shown in Fig. 6 the guide 62a for the valve 58a is formed in the piston 64a instead of in the body 38a and the valve seat 57a placed concentrically with respect to the piston 64a and cylinder 42a. In this manner the dough is drawn directly into the cylinder 42a through the receiving chamber 41a, instead of laterally into the same as is the case with the device previously referred to.

The valve stem 61a of the form of the invention shown in Fig. 6 extends below the piston 64a and is constructed with a threaded end 121. This threaded end screws into an arm 122 formed on the collar 88a of sleeve 86a. The two pins 89a are set midway between the centers of the valve 58a and the die 68a.

As will be noted in Fig. 5 the piston 64a is operated by the lever 93a which is mounted upon a stub shaft 91a. This shaft, however, extends completely through the leg 46a and also forms a support for the lever 102a which is properly proportioned to engage the pins 89a and operate the sleeve 86a and the valve 58a simultaneously.

In the modification of the invention the operation is the same as that previously described except that the valve 58a and sleeve 86a move in unison. The flow of dough into the chamber 41a is cut off at the same time that the outlet 76a is opened, whereby the timing of the two flow control members of the invention is made positive and simultaneous. The construction shown in Figs. 4, 5 and 6 is thus considerably simpler than that previously described and due to the constriction formed in the die no appreciable travel of the dough results while moving valve head 59a into engagement with valve seat 57a.

The advantages of my invention are manifest. The device is extremely simple in construction and positive in operation. By arranging the operating elements to travel in the same direction a single cam shaft can be easily and conveniently used for actuating all of the parts of the cutter. Due to the arrangement of the piston and valve, the dough enters the receiving chamber and cylinder in a direct manner so that uniform quantities of dough are discharged at each operation of the cutter. Due to the constriction formed in the passageway in which the dough travels in being discharged from the device, the pressure is sufficiently increased to equalize over the entire area of the dough discharge passageway and doughnuts of uniform dimensions throughout the circumferential extent thereof result. My device can be easily taken apart and cleaned. With my invention tight joints can easily be procured and alignment of bores and parts operating therein eliminated.

Changes in the specific form of my invention, as herein disclosed, may be made within the scope of what is claimed without departing from the spirit of my invention.

Having described my invention, what I claim as new and desire to protect by Letters Patent is:

1. A dough cutter comprising a body having a vertical discharge passageway provided with a discharge opening at the lower end thereof, a cylinder formed in said body adjacent said passageway and extending in parallel relation therewith, a receiving chamber situated above said discharge passageway and above said cylinder and communicating with both said discharge passageway and with said cylinder from above and a dough receptacle situated above said chamber and communicating with the same.

2. A dough cutter comprising a body having a vertical discharge passageway provided with a discharge opening at the lower end thereof, a cylinder formed in said body laterally of and adjacent said passageway and extending in spaced parallel relation therewith, a receiving chamber situated above said discharge passageway and above said cylinder and communicating with both said discharge passageway and with said cylinder from above, a dough receptacle situated above said chamber and communicating with the same and a valve member arranged for vertical movement and controlling the passage of dough from said receiver and into said chamber.

3. A dough cutter comprising a body having a vertical discharge passageway, a tube depending therefrom and having a bore concentric with said passageway and open at the lower end, an elongated support disposed within said passageway and bore, a die head secured to the end of said support and spaced from the end of said tube to form an annular passageway therebetween, a sleeve slidably mounted on said tube and adapted to engage said head to close said annular opening, said body being formed with a cylinder adjacent said passageway and parallel therewith, said cylinder being open at its lower end, said body further having a chamber at the upper portion of the same communicating with said cylinder and said passageway, a dough receptacle positioned above said chamber and communicating therewith and a valve member arranged for vertical movement and having a portion thereof extending below said body, said valve member controlling communication between said dough receptacle and said chamber.

4. A dough cutter comprising a body having a vertically extending pasageway therein, die means at the lower end of said passageway for forming annular extrusions from dough passing said passageway, said body being formed with a cylinder arranged in parallel relation with respect to said discharge passageway, said body having a chamber therein communicating with said cylinder and discharge passageway, a dough receptacle superimposing said body and communicating with said chamber, means forming a valve seat between said receptacle and chamber, a valve head adapted to seat against said valve seat and a valve stem slidably mounted for movement in a direction parallel with the axis of said cylinder, said valve stem supporting said valve head and having a portion extending below said body.

5. A dough cutter comprising a body having a vertical cylindrical discharge passageway, die means at the end of said passageway for forming annular extrusions from the dough passing through said passageway, a cylinder disposed adjacent said passageway, a piston therein, said body having a chamber communicating with said passageway and cylinder, a dough receptacle positioned above said body and having an opening communicating with said chamber, a valve member for closing said dough receptacle opening and having a valve stem guided for reciprocating movement in said body, the axis of said discharge passageway, said cylinder and said valve stem being all disposed in parallel relation.

6. A dough cutter comprising a body having a vertical cylindrical discharge passageway, die means at the end of said passageway for forming annular extrusions from the dough passing through said passageway, a cylinder disposed adjacent said passageway, a piston therein, said body having a chamber communicating with said passageway and cylinder, a dough receptacle positioned above said body and having an opening communicating with said chamber, a valve member for closing said dough receptacle opening and having a valve stem guided for reciprocating movement in said body, the axis of said discharge passageway, said cylinder and said valve stem being all disposed in parallel relation and being disposed in a common plane.

7. A dough cutter comprising a body having a vertical cylindrical discharge passageway, die means at the end of said passageway for forming annular extrusions from the dough passing through said passageway, a cylinder disposed adjacent said passageway, a piston therein, said body having a chamber communicating with said passageway and cylinder, a dough receptacle positioned above said body and having an opening communicating with said chamber, a valve member for closing said dough receptacle opening and having a valve stem guided for reciprocating movement in said body, the axis of said discharge passageway, said cylinder and said valve stem being all disposed in parallel relation and the axis of said valve stem and piston being coincident.

8. A dough cutter comprising a body providing a cylindrical discharge passageway, an elongated support within said passageway concentrically disposed relative thereto, a die head at the end of said support spaced from the portion of the body forming the end of said passageway to provide an annular outlet and constricting means concentric with said passageway and elongated member and situated above said die head and forming a constriction in said passageway reducing the cross sectional area of the passageway at the constriction as compared to the cross sectional area of the passageway at the locality of the outlet to equalize the pressure throughout the entire circumference of the outlet.

9. A dough cutter comprising a body providing a cylindrical discharge passageway, an elongated support within said passageway concentrically disposed relative thereto, a die head at the end of said support spaced from the portion of the body forming the end of said passageway to provide an annular outlet, said support having a circumferentially extending enlargement situated above said die head and forming a constriction in said passageway reducing the cross sectional area of the passageway at the constriction as compared to the cross sectional area of the passageway at the locality of the outlet to equalize the pressure throughout the entire circumference of the outlet.

ALEXANDER S. T. LAGAARD.